US009252600B2

(12) United States Patent
Inzunza Figueroa et al.

(10) Patent No.: US 9,252,600 B2
(45) Date of Patent: Feb. 2, 2016

(54) CONNECTION APPARATUS FOR POWER CONVERTER

(71) Applicant: TOSHIBA MITSUBISHI-ELECTRIC INDUSTRIAL SYSTEMS CORPORATION, Tokyo (JP)

(72) Inventors: Ruben Alexis Inzunza Figueroa, Tokyo (JP); Nobuhiro Takahashi, Tokyo (JP); Eiichi Ikawa, Tokyo (JP); Takeshi Sumiya, Tokyo (JP); Yosuke Fujii, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 706 days.

(21) Appl. No.: 13/673,457

(22) Filed: Nov. 9, 2012

(65) Prior Publication Data

US 2013/0063992 A1 Mar. 14, 2013

Related U.S. Application Data

(63) Continuation of application No. PCT/JP2010/058057, filed on May 12, 2010.

(51) Int. Cl.
*H02J 1/00* (2006.01)
*H02J 3/00* (2006.01)
*H02J 3/38* (2006.01)
*H02M 7/42* (2006.01)

(52) U.S. Cl.
CPC . *H02J 3/383* (2013.01); *H02J 3/38* (2013.01); *H02M 7/42* (2013.01); *Y02E 10/563* (2013.01); *Y10T 307/696* (2015.04); *Y10T 307/707* (2015.04)

(58) Field of Classification Search
CPC ......... Y10T 307/707; H02J 3/38; H02J 3/383
USPC ...................................... 307/43, 82
See application file for complete search history.

(56) References Cited

U.S. PATENT DOCUMENTS

2008/0238195 A1* 10/2008 Shaver ................... H02H 9/041
307/18

FOREIGN PATENT DOCUMENTS

| CN | 1271207 A | 10/2000 |
|---|---|---|
| CN | 1930754 A | 3/2007 |
| JP | 7-67346 | 3/1995 |

(Continued)

OTHER PUBLICATIONS

English-language International Preliminary Report on Patentability from Japanese Patent Office for International Application No. PCT/JP2010/058057, mailed Dec. 20, 2012, 6 pgs.

(Continued)

*Primary Examiner* — Carlos Amaya
(74) *Attorney, Agent, or Firm* — Finnegan, Henderson, Farabow, Garrett & Dunner, LLP

(57) ABSTRACT

A power converter apparatus is provided with a lead-in board in which alternating-current power received from power converting units is connected in parallel, and a connection base including frames for installing the power converting units therein. The frames are provided with connection sections for connecting the main circuits of the power converting units. The lead-in board is provided with breakers for cut off alternating-current power from the power converting units.

14 Claims, 4 Drawing Sheets

(56) References Cited

FOREIGN PATENT DOCUMENTS

| | | |
|---|---|---|
| JP | 9-46909 | 2/1997 |
| JP | 9-201061 | 7/1997 |
| JP | 2000-166097 | 6/2000 |
| JP | 2000-341959 | 12/2000 |
| JP | 2005-86969 | 3/2005 |

OTHER PUBLICATIONS

Notification of First Office Action, in corresponding Chinese Patent Application 201080066677.5, mailed Jul. 3, 2014, and English translation thereof.

English-language International Search Report from Japanese Patent Office for International Application No. PCT/JP2010/058057, mailed Aug. 10, 2010.

\* cited by examiner

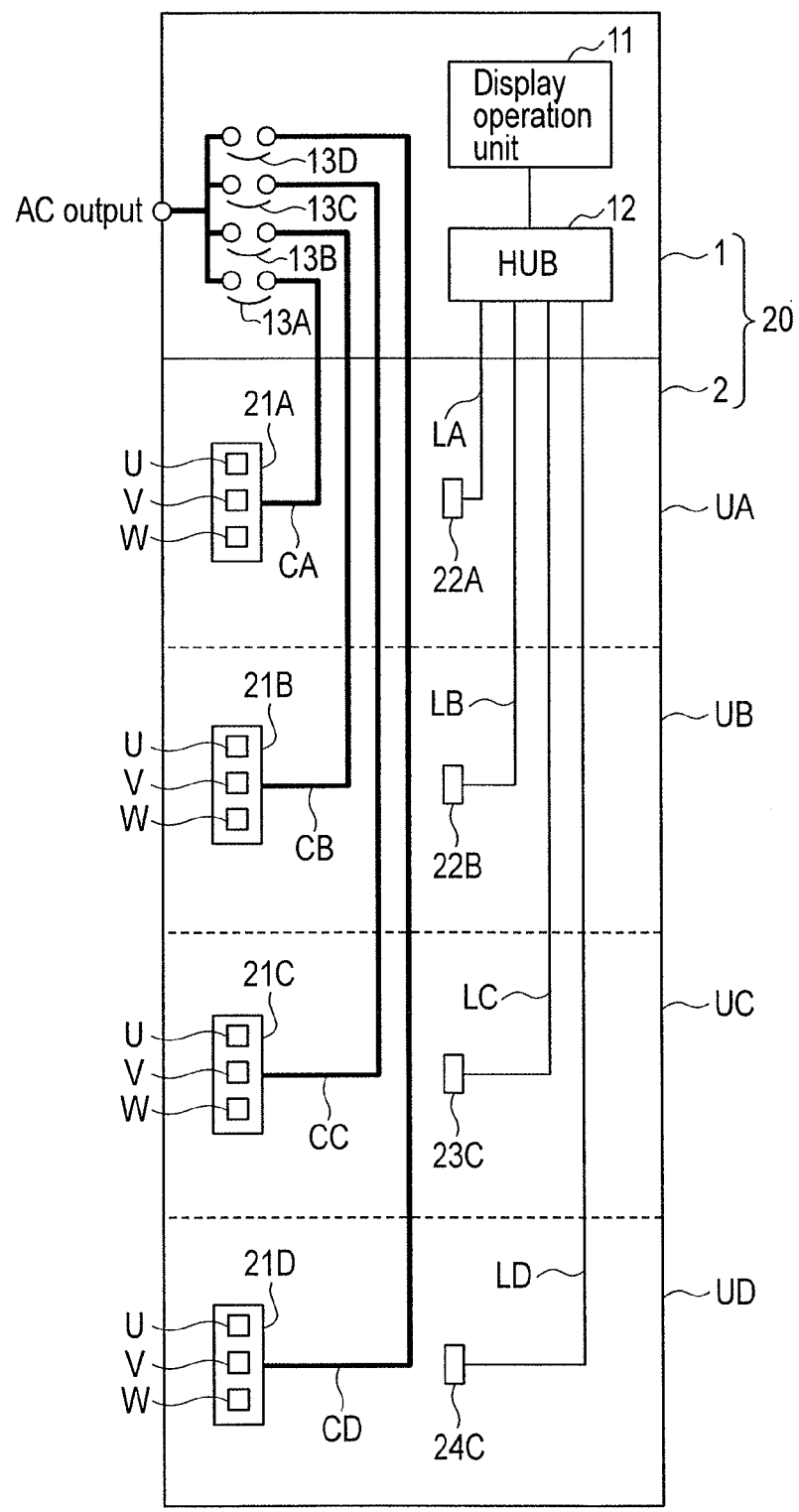
F I G. 3

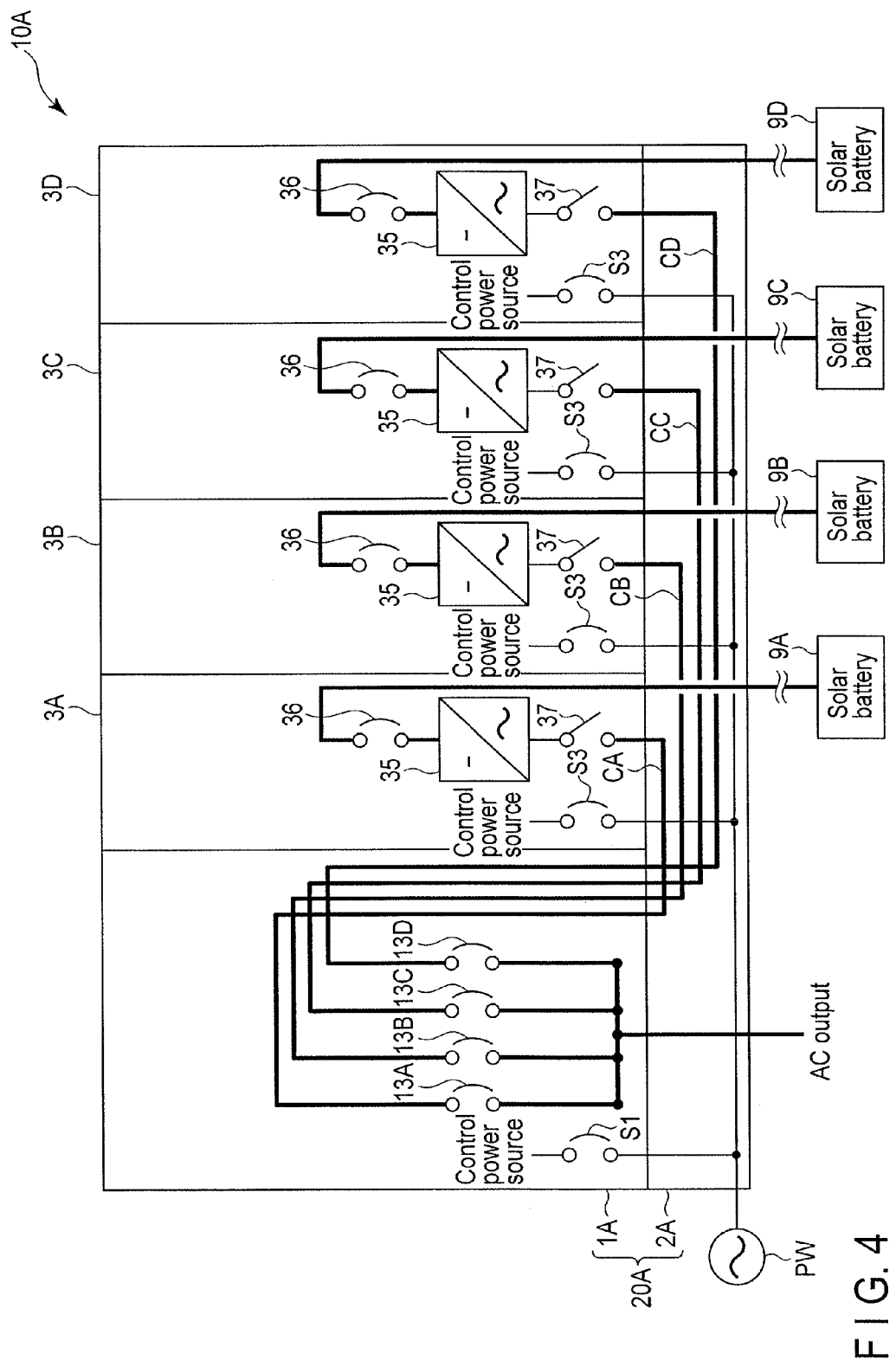
F I G. 4

US 9,252,600 B2

CONNECTION APPARATUS FOR POWER CONVERTER

CROSS REFERENCE TO RELATED APPLICATIONS

This application is a Continuation Application of PCT Application No. PCT/JP2010/058057, filed May 12, 2010, the entire contents of which are incorporated herein by reference.

BACKGROUND OF THE INVENTION

1. Field of the Invention

The present invention relates to a connection apparatus for connecting single-unit power converters.

2. Description of the Related Art

In general, in the field of, for example, solar energy generation, a plurality of single-unit power converters are connected in parallel to provide a power converter of a large capacity.

However, the operation of connecting a plurality of single-unit power converters in parallel requires lots of time and labor in installation and wiring.

BRIEF SUMMARY OF THE INVENTION

It is an object of the invention to provide a connection apparatus capable of easily connecting single-unit power converters.

In accordance with an aspect of the invention, there is provided a connection, apparatus for a power converter apparatus which comprises power converting units with power converting circuits configured to convert direct-current power into alternating-current power, a lead-in board configured to receive alternating-current power output from the power converting units, and frames configured to mount therein the power converting units, comprising: alternating-current output connecting means provided in the respective frames for connecting to output terminals configured to output alternating-current power of the power converting units; cables configured to electrically connect the alternating-current output connecting means in the respective frames to the lead-in board; a parallel circuit formed of the cables connected in parallel; and opening/closing means incorporated, in the lead-in board for opening and closing alternating-current power lines, the alternating-current power lines connecting the power converting units to the parallel circuit.

BRIEF DESCRIPTION OF THE SEVERAL VIEWS OF THE DRAWING

FIG. 3 is a view illustrating the structure of a connection apparatus for the power converter apparatus of the first embodiment; and FIG. 4 is a view illustrating the structure of the main circuit of a power converter apparatus according to a second embodiment of the invention.

DETAILED DESCRIPTION OF THE INVENTION

Embodiments of the invention will be described with reference to the accompanying drawings.

First Embodiment

Figure 1:
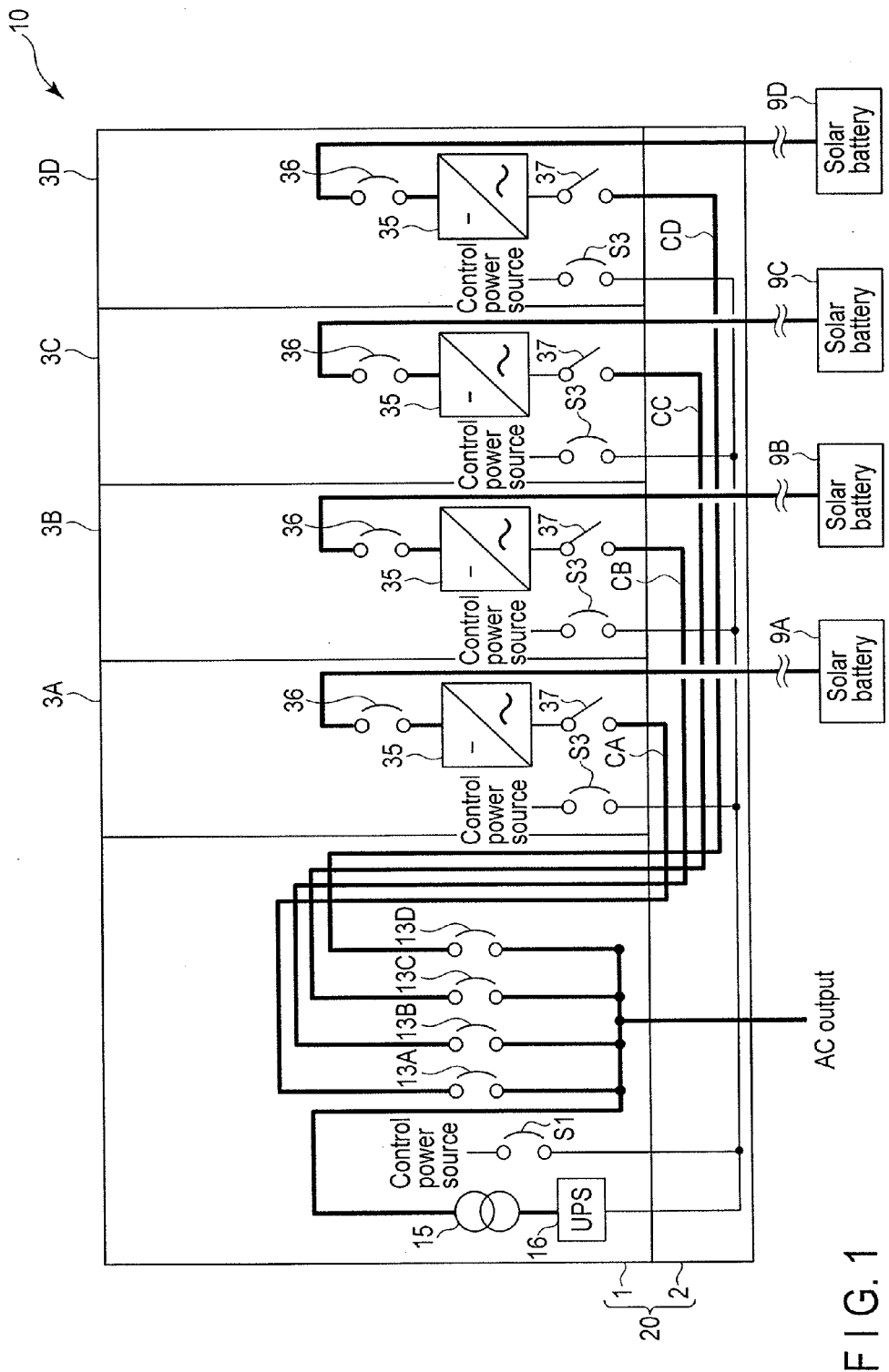
FIG. 1 is a view illustrating the structure of the main circuit of a power converter apparatus according to a first embodiment of the invention.
Figure 2:
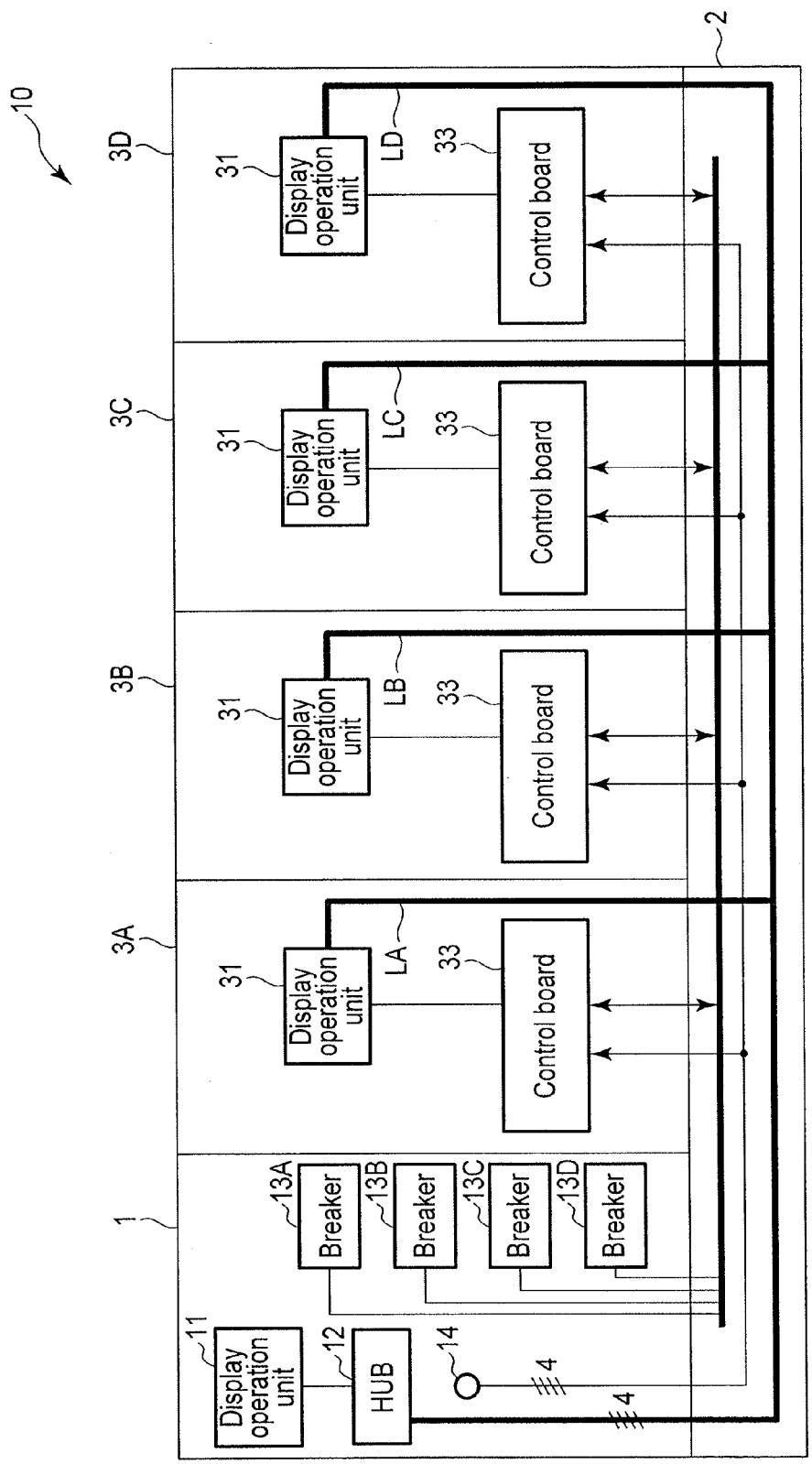
FIG. 2 is a view illustrating the structure of a control system circuit for the power converter apparatus of the first embodiment.

FIG. 1 is a view illustrating the structure of the main circuit of a power converter apparatus 10 according to a first embodiment of the invention. FIG. 2 is a view illustrating the structure of a control system circuit for the power converter apparatus 10 of the first embodiment. FIG. 3 is a view illustrating the structure of a connection apparatus 20 for the power converter apparatus 10 of the first embodiment. In these figures, like reference numbers denote like elements, and description will be given mainly of different portions.

The power converter apparatus 10 comprises four power converting units 3A, 3B, 3C and 3D, and a connection apparatus 20 for the power converting units. The connection apparatus 20 for the power converting units comprises a lead-in board 1 and a connection base 2.

The lead-in board 1 comprises a circuit formed of the alternating-current (AC) sides of four power converting units 3A to 3D connected in parallel. The lead-in board 1 is configured to lead in the AC power of the four power converting units 3A to 3D. The AC power output from the four power converting units is synthesized by the parallel-connected circuit. The lead-in board 1 outputs the AC power synthesized by the parallel-connected circuit. The lead-in board 1 supplies the synthesized high AC power to an AC load. Furthermore, the lead-in board 1 supplies the synthesized high AC power to control power sources for the four power converting units 3A to 3D and the lead-in board 1 itself.

The connection base 2 is provided for fixing the lead-in board 1 and the four power converting units 3A to 3D on the ground. The lead-in board 1 is placed on the connection base 2. When the four power converting units 3A to 3D are placed on the connection base 2, the main circuits and control circuits of the lead-in board 1 and the power converting units 3A to 3D are connected.

The power converting units 3A to 3D are machines installed at the connection apparatus 20 for the power converter apparatus. The power converting units 3A to 3D are single-unit power converters that can be operated independently, and are, for example, power conditioning Systems (PCS). The direct-current (DC) sides of the power converting units 3A to 3D is connected to solar batteries 9A, 9B, 9C and 9D, respectively. The AC sides of the power converting units 3A to 3D is connected to the main circuit of the lead-in board 1 via cables CA, CB, CD and CD, respectively. Further, the power converting units 3A to 3D are connected to the lead-in board 1 via local area network (LAN) lines LA to LD.

Referring now to FIG. 1, the main circuit of the power converter apparatus 10 will be described.

Each of the power converting units 3A to 3D comprises a power converter 35, a DC breaker 36, a contactor 37 and a control power switch S3.

The power converter 35 comprises a power converting circuit for converting the DC power supplied from the solar battery 9A to 9D into a three-phase AC current. The power converter 35 outputs the resultant three-phase AC current.

The DC breaker 36 is provided at the DC input side of the power converter 35. When the DC breaker 36 is closed, the DC power is supplied from the solar battery 9A to 9D to the power converter 35. When the DC breaker 36 is open, no DC power is supplied from the solar battery 9A to 9D to the power converter 35.

The contactor 37 is provided at the AC output side of the power converter 35. The AC output side of the power converter 35 is connected to the cable CA to CD. When the contactor 37 is closed, AC power is output from the power converter 35. When the contactor 37 is open, no AC power is output from the power converter 35.

The control, power switch S3 is provided to operate the power converting unit 3A to 3D and stop the operation of the same.

The lead-in board 1 comprises breakers 13A, 13B, 13C and 13D, a transformer 15, an uninterruptible power system (UPS) 16, and a control power source switch S1.

The breakers 13A to 13D are connected to the AC output sides of the power converting units 3A to 3D via the cables CA to CD, respectively. The output sides of the four breakers 13A to 13D are connected in parallel. Accordingly, the AC power output from the four breakers 13A to 13D is synthesized.

The synthesized AC power is supplied as the AC output of the power converter apparatus 10 to the AC load and the control power sources of all the power converting units 3A to 3D. When the breakers 13A to 13D are closed, AC power is output from the power converting units 3A to 3D, respectively. When the breakers 13A to 13D are open, no AC power is output from the power converting units 3A to 3D corresponding to the breakers 13A to 13D.

The transformer 15 transforms the synthesized AC power into an AC voltage appropriate for the UPS 16.

The UPS 16 supplies AC power to the control power sources of the power converting units 3A to 3D and the lead-in board 1, based on the AC power supplied from the transformer 15.

The control power source switch S1 is used to operate and stop the lead-in board 1.

Referring then to FIG. 2, a description will be given of a control circuit for the power converter apparatus 10.

Each of the power converting units 3A to 3D comprises a display operation unit 31 and a control board 33.

The display operation unit 31 has an operation function of operating the power converting units 3A to 3D, and a display function of displaying information used for, for example, monitoring. The display operation unit 31 performs transmission and reception of information to and from the lead-in board 1 and the power converting units 3A to 3D via the LAN lines LA to LD.

More specifically, the operation function is used to operate the corresponding one of the power converting units 3A to 3D, also to operate the other power converting units 3A to 3D, and to operate each element of the lead-in board 1.

For instance, each display operation unit 31 opens and closes the DC breakers 36 and contactors 37 of all the power converting units 3A to 3D, and operates (e.g., starts the operation, adjusts the operation, and stops the operation) the power converters 35 of all the power converting units 3A to 3D. Further, regarding the operations for the lead-in board 1, each display operation unit 31 opens and closes the breakers 13A to 13D. More specifically, each display operation unit 31 performs open/close operations of the corresponding one of the breakers 13A to 13D, performs open/close operations of an arbitrary one of the breakers 13A to 13D, and simultaneously performs open/close operations of all the breakers 13A to 13D.

Further, each display operation unit 31 displays, for example, the open and closed states of the DC breakers 36 and the contactors 37, and the operation states of the power converters 35.

Each control board 33 performs processes associated with the control of the power converter apparatus 10. The control board 33 performs control upon receiving a control instruction, such as an operation control, sent from the display operation unit 31, the lead-in board 1, or any other power converting unit 3A to 3D for controlling its own power converting unit 3A to 3D. In accordance with the operation of the display section 31, the control board 33 controls the elements of the power converting unit 3A to 3D, and outputs a control instruction to the lead-in board 1 or any other power converting unit 3A to 3D.

The lead-in board 1 further comprises a display operation unit 11, a HUB 12, the aforementioned breakers 13A to 130, and an emergency stop button 14.

The HUB 12 is connected to the display operation units 31 of the power converting units 3A to 3D via the LAN lines LA to LD, respectively.

The display operation unit 11 has a function of operating ail elements of the power converter apparatus 10, and a function of displaying all information associated with the power converter apparatus 10.

Regarding the operation for the power converting units 3A to 3D, the display operation unit 11 has a function equivalent to that of the display operation unit 31 of each power converting unit 3A to 3D. The display operation unit 11 operates an arbitrary one of the power converting units 3A to 3D, displays an abnormality or an alert, and instructs transmission/reception of information. Regarding the operation for the lead-in board 1, the display operation unit 11, for example, opens and closes an arbitrary one of the breakers 13A to 13D.

The display operation unit 11 accesses the HUB 12 to acquire the information associated with all the power converting units 3A to 3D. Based on the thus-acquired information, the display operation unit 11 displays arbitrary information associated with the power converter apparatus 10. The display operation unit 11 transmits information to arbitrary one(s) of the power converting units 3A to 3D via the HUB 12.

The display operation unit 11 has a display function of displaying information associated with the power converting units 3A to 3D, which function is equivalent to that of the display operation units 31 of the power converting units 3A to 3D. The display operation unit 11 displays a current, voltage or power supplied to the load, and displays information associated with, for example, an abnormality state of each element of the power converter apparatus 10, an alert thereto, and a monitored state thereof.

The emergency stop button 14 is used to urgently stop the operation of the power converter apparatus 10 in an emergency case. When an operator presses the emergency stop button 14, all breakers 13A to 13D, and all DC breakers 36 and contactors 37 of the power converting units 3A to 3D, are released. Further, in this case, the power converting operations of the power converters 35 of the power converting units 3A to 3D may be stopped.

Referring then to FIG. 3, a description will be given of the connection apparatus 20 of the power converter apparatus.

The connection apparatus 20 of the power converter apparatus comprises the connection base 2 and the lead-in board 1 attached thereto.

The connection base 2 comprises four frames UA, UB, UC and UD for installing the four power converting units 3A, 3B, 3C and 3D, respectively. The connection base 2 is formed of, for example, a shaped steel.

The frames UA, UB, UC and UD comprise AC output connection sections 21A, 21B, 21C and 21D and connectors 22A, 22B, 22C and 22D, respectively.

The AC output connection, sections 21A to 21D are sections to be connected to the AC output terminals of the power converting units 3A to 3D. When the AC output terminals of the power converting units 3A to 3D are connected to the AC output connection sections 21A to 21D, respectively, the U, V and W phases of the three-phase alternating current are connected to the lead-in board 1 via the cables CA, CB, CC and CD. As a result, the main circuit of the power converter apparatus 10 is formed.

The connectors 22A, 22B, 22C and 22D are connection sections for connecting the LAN lines LA, LB, LC and LD to the power converting units 3A, 3B, 3C and 3D to transmit information thereto and receives information therefrom. When the power converting units 3A to 3D are connected to the connectors 22A to 22D via the LAN lines LA to LD, a network for enabling the power converting units 3A to 3D to transmit and receive information to and from the lead-in board 1 is formed by the LAN lines LA to LD.

In the first embodiment, the connection apparatus 20 enables the power converter apparatus 10 of a large capacity, which comprises the plurality of single-unit power converting units 3A to 3D connected in parallel, to be constructed easily. For instance, when a plurality of existing power converters 3A to 3D are installed, the use of the connection apparatus 20 for power converter can shorten the time required to construct the power converter apparatus 10 of a large capacity, which comprises the plurality of single-unit power converting units 3A to 3D connected in parallel.

Further, by connecting the plurality of power converting units 3A to 3D in parallel by the connection apparatus 20 for power converter, the power converting units 3A to 3D can be operated, monitored and managed simultaneously. Furthermore, since the lead-in board 1 and the power converting units 3A to 3D are connected by the connection base 2 and the LAN lines LA to LD, information can be interactively transmitted between the lead-in board 1 and the power converting units 3A to 3D. As a result, any one of the lead-in board 1 and the power converting units 3A to 3D can operate, monitor and manage the entire power converter apparatus 10.

In addition, the emergency stop button 14 of the lead-in board 1 can easily stop the operation of the power converter apparatus 10 in an emergency case.

Also, since the breakers 13A to 13D corresponding to the power converting units 3A to 3D are incorporated in the lead-in board 1, the lead-in board 1 can protect the main circuit.

Moreover, by selectively releasing the breakers 13A to 13D, the main circuits can be easily cut, thereby further facilitating the maintenance of the power converter apparatus 10.

Second Embodiment

FIG. 4 shows the main circuit of a power converter apparatus 10A according to a second embodiment of the invention.

The power converter apparatus 10A supplies, to the control power sources of the power converting units 3A to 3D and the lead-in board 1, AG power from an AC power source PW as another system, instead of the AC power based on the solar batteries 9A to 9D. The other structure of the second embodiment is similar to that of the first embodiment.

A lead-in board 1A incorporated in the second embodiment is obtained by removing the transformer 15 and the UPS 16 from the lead-in board 1 of the first embodiment shown in FIG. 1. A connection base 2A incorporated in the second embodiment is obtained by modifying the connection base 2 of the first embodiment shown in FIG. 1 to include a line for receiving AC power from the external AC power source PW. The other structure of the second embodiment is similar to that of the first embodiment.

The connection base 2A applies the AC power from the external AC power source PW to the control power sources of the lead-in board 1 and the four power converting units 3A to 3D.

In the power converter apparatus 10A of the second embodiment, AC power is supplied from the external AC power source PW to the control power sources of the lead-in board 1 and the four power converting units 3A to 3D. This structure can provide the same advantage as the first embodiment.

The present invention is not limited to the above-described embodiments, but may be modified in various ways without departing from the scope. Various inventions can be realized by appropriately combining the structural elements disclosed in the embodiments. For instance, some of the disclosed structural elements may be deleted. Some structural elements of different embodiments may be combined appropriately.

What is claimed is:

1. A connection apparatus for a power converter apparatus which comprises power converting units with power converting circuits configured to convert direct-current power into alternating-current power, a lead-in board configured to receive alternating-current power output from, the power converting units, and frames configured to mount therein the power converting units, the connection apparatus comprising:
   alternating-current output connecting units provided in the respective frames and configured to connect to output terminals configured to output alternating-current power of the power converting units;
   cables configured to electrically connect the alternating-current output connecting units in the respective frames to the lead-in board;
   a parallel, circuit configured to connect the cables in parallel; and
   opening/closing units incorporated in the lead-in board and configured to open and close alternating-current power lines, the alternating-current power lines connecting the power converting units to the parallel circuit.

2. The connection apparatus of claim 1, wherein the lead-in board comprises a simultaneous opening unit configured to simultaneously open, the opening/closing units.

3. The connection apparatus of claim 1, wherein
   the power converting units comprise alternating-current side opening/closing units provided on an alternating-current side of the power converting circuits and configured to stop output of alternating-current power when the alternating-current side opening/closing units are opened; and
   the lead-in board comprises a simultaneous opening unit configured to simultaneously open the alternating-current side opening/closing units of the power converting units.

4. The connection apparatus of claim 1, wherein
   the power converting units comprise direct-current side opening/closing units provided on a direct-current side of the power converting circuits and configured to stop input of direct-current power when the direct-current side opening/closing units are opened; and
   the lead-in board comprises a simultaneous opening-unit configured to simultaneously open the direct-current side opening/closing units of the power converting units.

5. The connection apparatus of claim 1, wherein the lead-in board and the power converting units have control power sources supplied with power on a basis of alternating-current power output from the power converting units and synthesized by the parallel circuit.

6. The connection apparatus of claim 1, further comprising information path connection units provided in the respective frames and configured to connect the power converting units to information paths for transmitting information between the power converting units and the lead-in board.

7. The connection apparatus of claim 6, wherein the lead-in board comprises a power converting/operating unit configured to operate the power converting units based on the information transmitted between the lead-in board and the power converting units via the information paths connected to the information path connection units.

8. A power converter apparatus comprising:
power converting units including power converting circuits configured to convert direct-current power into alternating-current power;
a connection base including frames used to mount the power converting units therein; and
a lead-in board configured to receive alternating-current power from the power converting units,
wherein
the connection base comprises:
alternating-current output connecting units provided in the respective frames and configured to connect output terminals configured to output alternating-current power of the power converting units; and
cables configured to electrically connect the lead-in board, to the alternating-current output connecting units provided in the respective frames,
the lead-in board comprises:
a parallel circuit configured to connect the cables in parallel; and
opening/closing units configured to open and close alternating-current, power lines, the alternating-current power lines connecting the power converting units to the parallel circuit.

9. The power converter apparatus of claim 8, wherein the lead-in board further comprises a simultaneous opening unit configured to simultaneously open the opening/closing units.

10. The power converter apparatus of claim 8, wherein
the power converting units further comprise alternating-current side opening/closing units provided on an alternating-current side of the power converting circuits and configured to stop output of alternating-current power when the alternating-current side opening/closing units are opened; and
the lead-in board further comprises a simultaneous opening unit configured to simultaneously open the alternating-current side opening/closing units of the power converting units.

11. The power converter apparatus of claim 8, wherein
the power converting units further comprise direct-current side opening/closing units provided on a direct-current side of the power converting circuits and configured to stop input of direct-current power when the direct-current side opening/closing units are opened; and
the lead-in board further comprises a simultaneous opening unit configured to simultaneously open the direct-current side opening/closing units of the power converting units.

12. The power converter apparatus of claim 8, wherein the lead-in board and the power converting units have control power sources supplied with power on a basis of alternating-current power output from the power converting units and synthesized by the parallel circuit.

13. The power converter apparatus of claim 8, wherein the connection base comprises information path connection units provided in the respective frames and configured to connect the power converting units to information paths for transmitting information between the power converting units and the lead-in board.

14. The power converter apparatus of claim 13, wherein the lead-in board further comprises a power converter operating unit configured to operate the power converting units based on the information transmitted between the lead-in board and the power converting units via the information paths connected to the information path connection units.

* * * * *